Dec. 20, 1927.
L. D. SOUBIER
1,653,480
CONVEYING APPARATUS
Filed Feb. 15, 1924
3 Sheets-Sheet 1
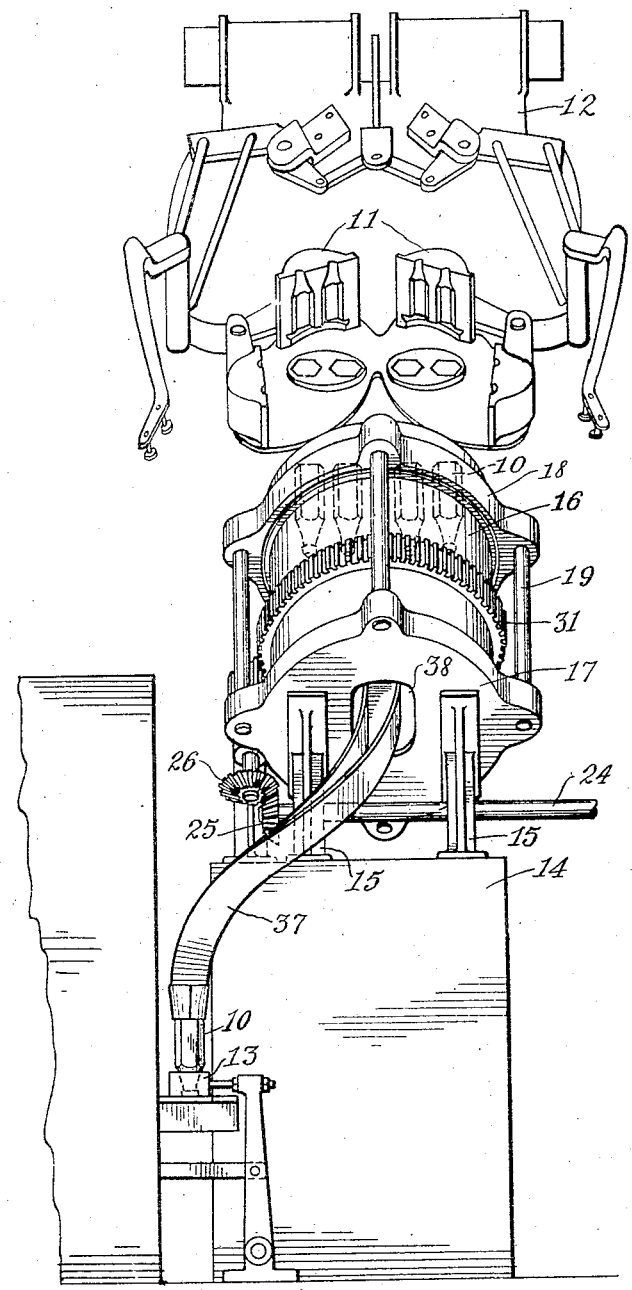
FIG-1-
INVENTOR
LEONARD D. SOUBIER
By J.F. Rule,
His Attorney.

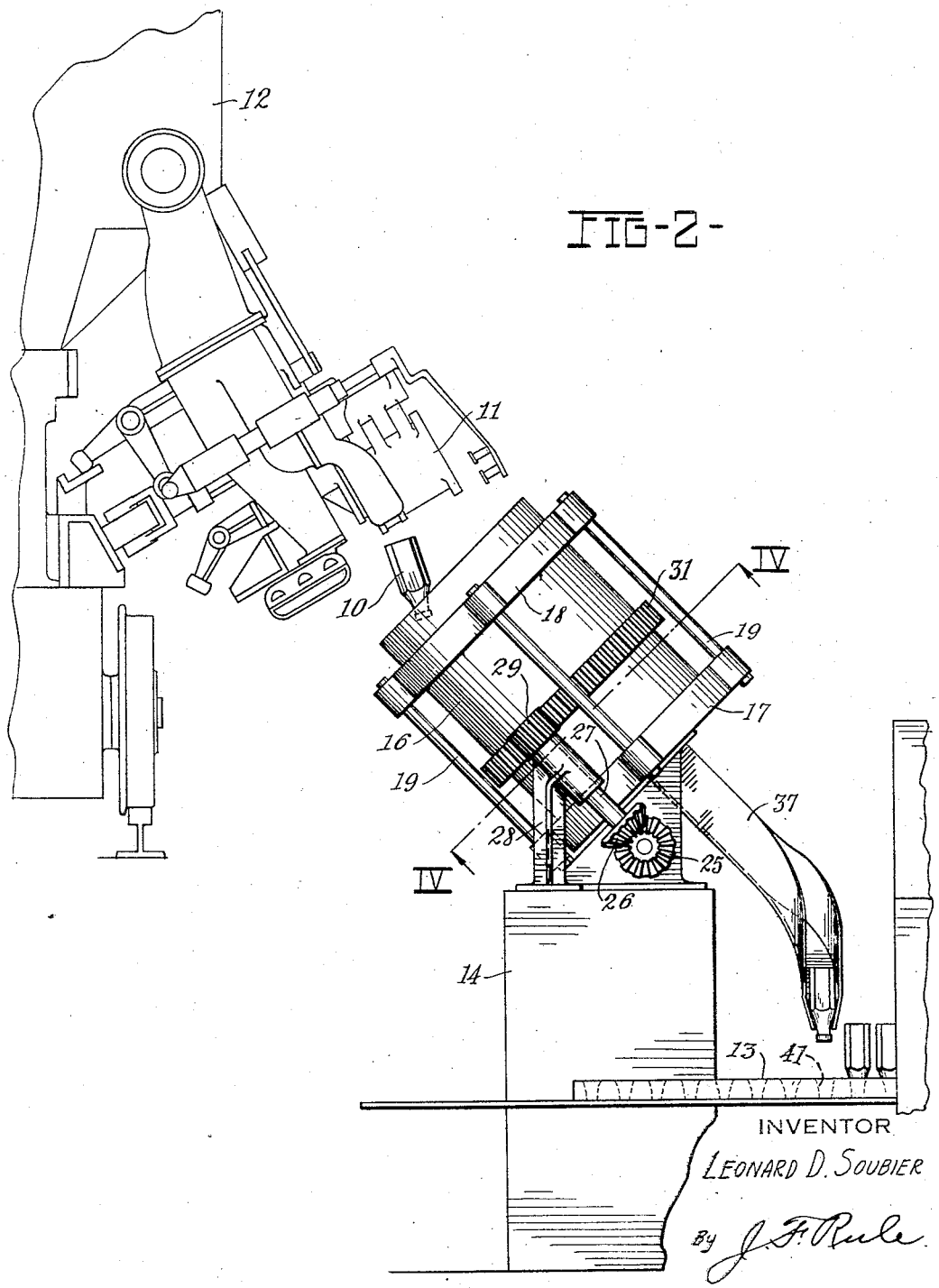

Dec. 20, 1927.
L. D. SOUBIER
1,653,480
CONVEYING APPARATUS
Filed Feb. 15, 1924   3 Sheets-Sheet 3
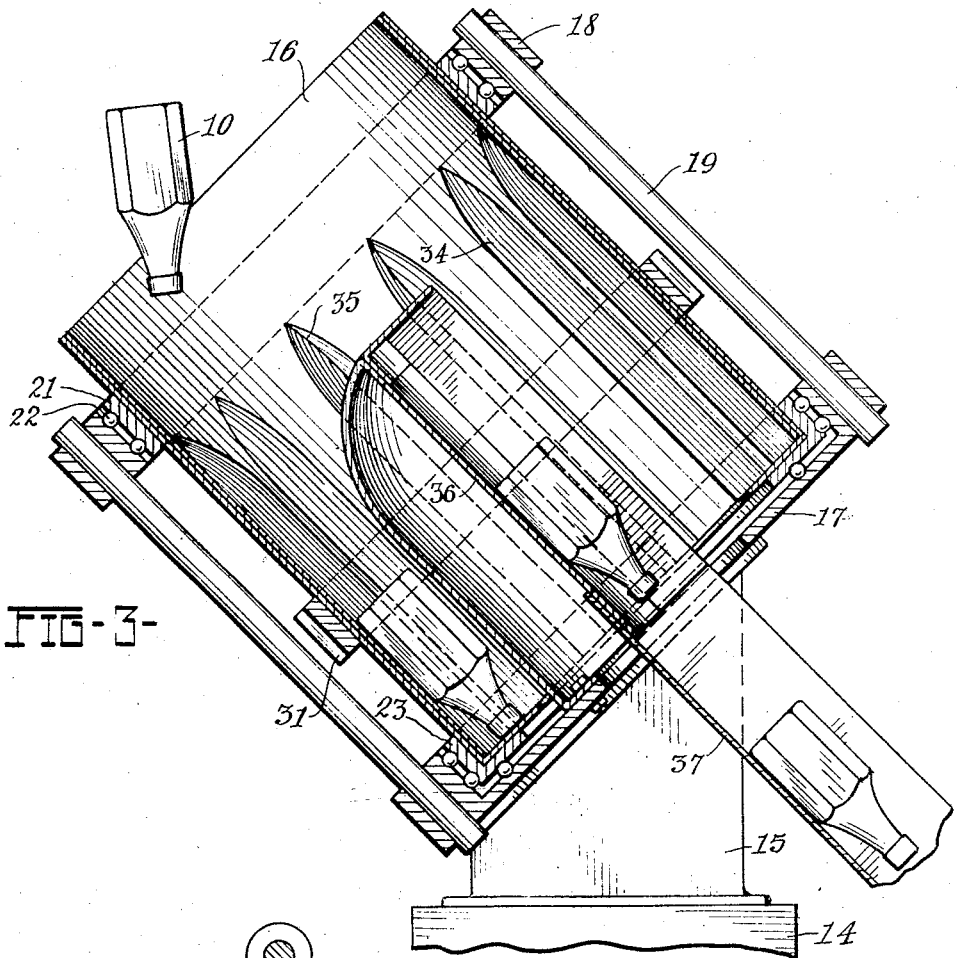
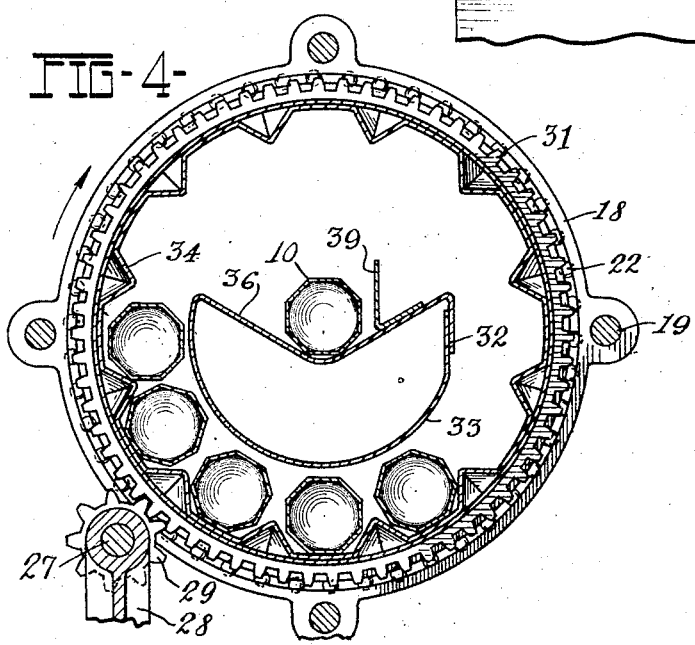
INVENTOR
LEONARD D. SOUBIER
By J. F. Rule
His Attorney Patented Dec. 20, 1927.

1,653,480

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

CONVEYING APPARATUS.

Application filed February 15, 1924. Serial No. 693,052.

My invention relates to apparatus designed to receive articles as, for example, bottles, jars or other glassware discharged from the molds of a forming machine, and delivering said articles at a point more remote from the machine.

An object of the invention is to provide apparatus of the character indicated, adapted for use with a machine delivering a plurality of such articles at one time, the apparatus being designed to discharge the articles one by one. The articles as thus discharged may be automatically placed on a leer pan, conveyor or other means for carrying the articles to the annealing leer.

A further object of the invention is to provide apparatus of the character indicated which will handle said articles in a manner to prevent them from becoming marred or distorted while they are still soft and plastic, and which will prevent them from coming in contact with each other and sticking together while in such plastic condition.

A further object of the invention is to provide apparatus of the character indicated suitable for receiving glass articles discharged several at a time from a forming machine, and deliver them to the type of leer pans or holders which are provided with individual cups or holders to receive the articles and which at the present day are standard equipment for use in connection with glass blowing machines which deliver articles one at a time from single molds.

Other objects of the invention will appear hereinafter.

In the accompanying drawings:

Figure 1 is a front elevation of apparatus constructed in accordance with the principles of my invention and also showing a portion of a bottle blowing machine in operative relation thereto.

Figure 2 is a side elevation of the same.

Figure 3 is a sectional elevation on a larger scale of the transfer mechanism.

Figure 4 is a section at the line IV—IV on Figure 2.

The transfer mechanism as herein shown is designed to receive the bottles 10 as they are discharged from the plural cavity molds 11 of a bottle blowing machine 12, and deliver the bottles one by one to leer pans 13 by which they are carried into the annealing leer. In the form of bottle blowing machine shown, the molds 11 are arranged in pairs, each mold having a plurality of mold cavities,—in this instance two. The molds of each pair are opened either simultaneously or in succession to permit the bottles to drop therefrom by gravity, so that a plurality of bottles are simultaneously discharged.

The transfer mechanism is mounted on a base 14 to which are secured brackets 15. These brackets support a stationary inclined frame in which an inclined drum 16 is mounted for continuous rotation. Said frame comprises a base plate 17 at the lower end of the drum, a ring 18 adjacent the upper end of the drum, and connecting posts 19. A bearing ring 21 is secured to the drum within the ring 18 and bearing balls 22 are provided between the rings 18 and 21. A bearing ring 23 is mounted on the drum at its lower end and bearing balls are interposed between it and the base 17. The drum 16 is rotated continuously by power supplied through a drive shaft 24 carrying a bevel pinion 25 in mesh with a pinion 26 on a shaft 27 journalled in a bracket 28. A pinion 29 on the shaft 27 drives a ring gear 31 secured to the drum.

Within the drum is a stationary distributor or guiding device 32 by which the bottles 10 as they are delivered to the drum are positioned and guided. The lower outer surface 33 of the device 32, as shown, is substantially semi-circular in cross-section, being substantially concentric with the lower portion of the drum. There is thus provided a space or channel between the surface 33 and the drum of sufficient width to permit the passage of the bottles, but only wide enough to permit the bottles to pass singly. The drum is provided on its inner peripheral face with inwardly projecting spacing ribs 34 extending lengthwise of the drum, the upper ends 35 preferably being tapered. The ribs 34 serve as guides to direct the bottles into the spaces or pockets formed between them and hold the bottles in parallel spaced relation. As the drum rotates in a clockwise direction, the bottles are carried upward along the guiding wall 33, the ribs 34 serving to hold the bottles and prevent them from rolling back along the drum. Each bottle as it passes beyond the curved wall 33 drops by gravity onto the upper inclined surface 36 of the member 32 and rolls down said surface to a position substantially central of the drum. A downwardly inclined chute 37 extends from the surface 36 through an opening 38 in the base plate 17. Each bottle as it rolls into said central position within the drum, slides down the chute by gravity. A shield 39 which may be an extension of the side wall of the chute 37, serves as a stop to prevent the bottles being thrown past the center of the drum as they roll down the surface 36. The bottles are discharged from the chute onto the leer pan 13 which may be operated in a well known manner to bring the cups or openings 41 therein successively beneath the chute for receiving the bottles. It will be observed that the apparatus herein shown is designed to prevent the bottles from coming in contact with each other, thus preventing marring or sticking together of the bottles.

Modifications may be resorted to within the spirit and scope of my invention.

What I claim is:

1. The combination of a machine having means for discharging a plurality of articles at a time, a drum to receive the articles, an article guiding member within the drum, spaced therefrom and presenting a surface parallel with the inner surface of the drum to provide a passageway for the articles, means to rotate one of said parts about the axis of the drum while the other part remains stationary and provides a guiding surface for the articles, and spaced ribs in said passageway moving with said rotating part for positioning, spacing and driving said articles.

2. Means for receiving, distributing, transporting and discharging articles, comprising a hollow drum open at one end to receive the articles, a distributing member within the drum spaced therefrom and presenting a surface parallel with the inner surface of the drum to provide a passageway for the articles, means to rotate one of said parts about the axis of the drum while the other part remains stationary and provides a stationary guiding surface for the articles, and spaced ribs in said passageway and carried by said rotating part for positioning, spacing and driving said articles.

3. The combination of a machine having means for discharging a plurality of articles at a time, a chute, and a distributing device operable to receive the articles as they are discharged from the machine and deliver them one by one to said chute, said distributing device comprising means for holding the articles separated so that they are prevented from coming in contact with each other during their passage from the machine to the chute.

4. The combination of a drum open at one end to receive articles, means to rotate the drum, a stationary device within the drum having a surface parallel with the inner surface of the drum, means cooperating with said surfaces for arranging and guiding the articles between said surfaces, and means for directing the articles singly to a discharging position at the center of the drum.

5. The combination of a drum open at one end to receive articles, means to continuously rotate the drum, means forming a stationary guiding surface concentric with the drum and providing therewith a passageway for the articles, and spaced ribs on the inner surface of the drum for positioning, spacing and driving the articles as the drum rotates.

6. The combination of a drum open at one end to receive articles, means to continuously rotate the drum, means forming a stationary guiding surface concentric with the drum and providing therewith a passageway for the articles, spaced ribs on the inner surface of the drum for positioning, spacing and driving the articles as the drum rotates, and means for guiding the articles to a discharge outlet as they pass beyond said passageway.

7. The combination of a distributing drum, means to rotate the drum about its axis, said axis being inclined to the horizontal and the drum being open at its upper end to receive articles, parallel ribs on the inner surface of the drum, a stationary guiding wall within the drum substantially concentric therewith and forming with the inner wall of the drum a passageway, and means providing a downwardly and inwardly inclined surface extending from the end of said passageway for guiding articles towards the axis of the drum, the latter being provided with a central outlet through its lower end for the discharge of articles.

Signed at Toledo, in the county of Lucas and State of Ohio, this 12th day of February, 1924.

LEONARD D. SOUBIER.